United States Patent
Ogiso

(10) Patent No.: US 6,651,619 B2
(45) Date of Patent: Nov. 25, 2003

(54) CONTROL SYSTEM AND CONTROL METHOD FOR INTERNAL COMBUSTION ENGINE

(75) Inventor: Makoto Ogiso, Mishima (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 10/346,026

(22) Filed: Jan. 17, 2003

(65) Prior Publication Data
US 2003/0140893 A1 Jul. 31, 2003

(30) Foreign Application Priority Data
Jan. 28, 2002 (JP) .......................... 2002-018620

(51) Int. Cl.[7] .............................. F01L 1/34; F02D 41/08
(52) U.S. Cl. .............................. 123/339.11; 123/339.18; 123/339.19; 123/90.15
(58) Field of Search ................ 123/339.11, 339.14, 123/339.18, 339.19, 90.15–90.18

(56) References Cited

U.S. PATENT DOCUMENTS

| | | | | | |
|---|---|---|---|---|---|
| 4,522,176 A | * | 6/1985 | Takao et al. | ............ | 123/339.24 |
| 5,115,782 A | * | 5/1992 | Klinke et al. | ............ | 123/90.11 |
| 5,529,031 A | * | 6/1996 | Yoshioka | ................ | 123/90.15 |
| 5,765,528 A | * | 6/1998 | Kamimaru | ............ | 123/339.14 |
| 6,006,725 A | * | 12/1999 | Stefanopoulou et al. | . | 123/90.15 |
| 6,250,283 B1 | * | 6/2001 | Russell et al. | ........... | 123/90.15 |
| 6,349,700 B1 | * | 2/2002 | Buckland et al. | ...... | 123/339.19 |
| 6,357,403 B1 | * | 3/2002 | Yano | ...................... | 123/90.11 |
| 6,516,777 B2 | * | 2/2003 | Yano | ..................... | 123/339.19 |

FOREIGN PATENT DOCUMENTS

| | | |
|---|---|---|
| JP | A 5-99006 | 4/1993 |
| JP | A 9-137741 | 5/1997 |

* cited by examiner

*Primary Examiner*—Erick Solis
(74) *Attorney, Agent, or Firm*—Oliff & Berridge, PLC

(57) ABSTRACT

An intake air volume flowing into an intake passage is controlled by a throttle opening. When the engine speed decreases, a valve timing of an intake valve and an exhaust valve is corrected so as to increase the torque of an internal combustion engine. The throttle opening is corrected so as to increase the intake air volume when the engine speed falls below a desired speed while an intake line pressure is equal to, or less than, a predetermined pressure.

21 Claims, 10 Drawing Sheets

FIG. 4A  BEFORE LEARNING NE 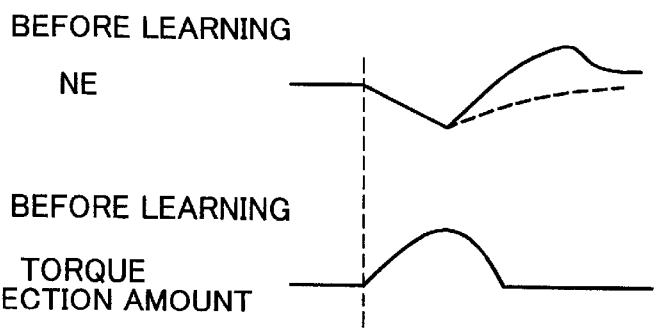
FIG. 4B  BEFORE LEARNING TORQUE CORRECTION AMOUNT 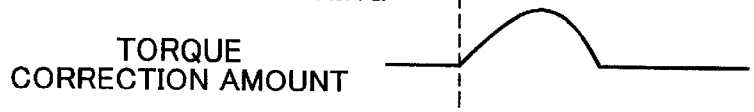
FIG. 4C  AFTER LEARNING NE 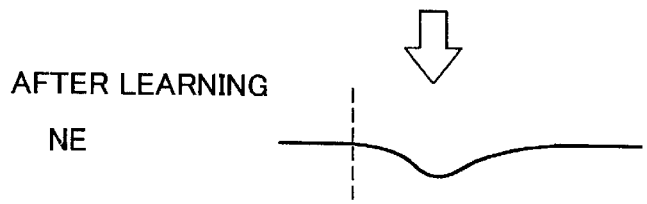
FIG. 4D  AFTER LEARNING TORQUE CORRECTION AMOUNT 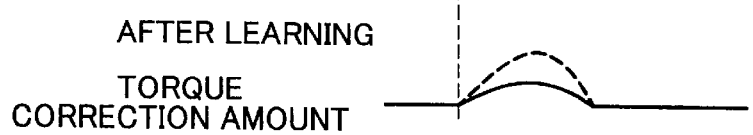

FIG. 5A HIGH PM VT CONTROL NE

FIG. 5B HIGH PM VT CONTROL TARGET TORQUE

FIG. 5C HIGH PM VT CONTROL GA

FIG. 5D LOW PM TA CONTROL (COMPARATIVE EXAMPLE) NE

FIG. 5E LOW PM TA CONTROL (COMPARATIVE EXAMPLE) TARGET TORQUE

FIG. 5F LOW PM TA CONTROL (COMPARATIVE EXAMPLE) GA

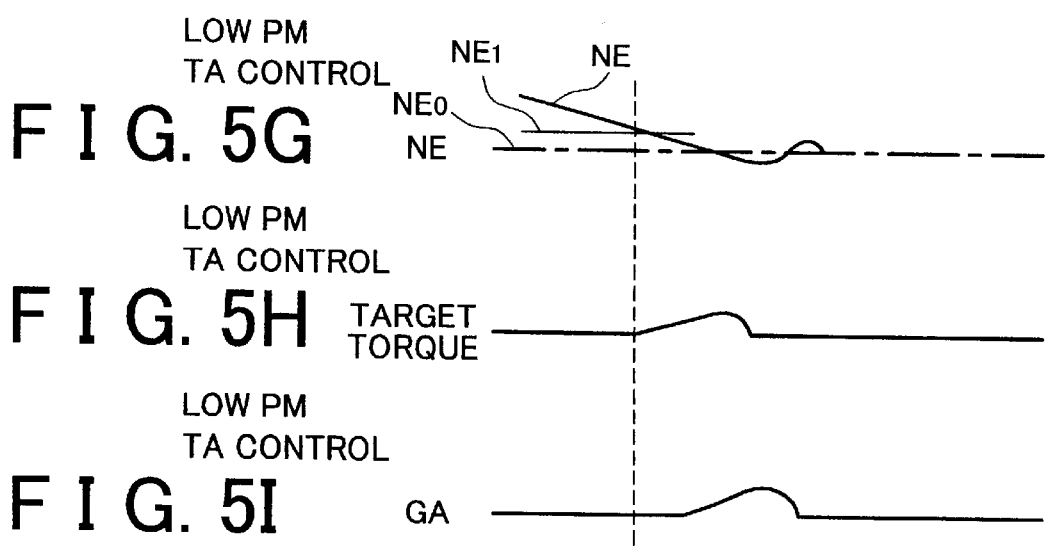

In1 VALVE

In2 VALVE

CONTROL SYSTEM AND CONTROL METHOD FOR INTERNAL COMBUSTION ENGINE

INCORPORATION BY REFERENCE

The disclosure of Japanese Patent Application No. 2002-18620 filed on Jan. 28, 2002, including the specification, drawings and abstract is incorporated herein by reference in its entirety.

BACKGROUND OF THE INVENTION

1. Field of Invention

This invention generally relates to a control system of an internal combustion engine, and more particularly to a control system of an internal combustion engine that is provided with a variable valve train in which the opening and closing characteristics of at least one of the intake valve and the exhaust valve can be changed.

2. Description of Related Art

A variable valve train has been known in the field of internal combustion engines which open and close at least one of the intake valve and the exhaust valve. This variable valve train enables a higher degree of freedom to be ensured with respect to control of the intake and exhaust, which enables the output characteristics and fuel consumption characteristics of the internal combustion engine to be improved compared to when the opening and closing characteristics of the intake and exhaust valves are fixed.

Japanese Patent Application 2001-81435, which is currently being submitted for application by the applicant of this application, for example, proposes an internal combustion engine that realizes a variable valve train function using electromagnetically driven valves. The intake and exhaust valves are electromagnetically driven and enables the opening and closing characteristics of those valves to be changed with an even higher degree of freedom than when a mechanical variable valve train is used. Therefore, this invention proposes a method for controlling the volume of air drawn into the internal combustion engine by controlling the opening and closing timing of the electromagnetically driven valves, and as a result, controlling the output torque of the internal combustion engine.

In the internal combustion engine provided with the variable valve train, the output torque can be quickly changed by changing the opening and closing timing of at least one of the intake valve and the exhaust valve. Therefore, when there is a decrease in idle speed of the internal combustion engine, the output torque can be immediately increased by appropriately changing the opening and closing timing of the valves, so as to prevent the engine from stalling. Accordingly, the variable valve train is an effective mechanism for preventing engine stall while idling.

However, depending on the opening and closing timing of at least one of the intake valve and the exhaust valve, the intake air volume only changes quickly when the intake line pressure is not very low. In other words, when there is a large intake load in the intake line, the output of the internal combustion engine is unable to change much even if the opening and closing timing of at least one of the intake valve and the exhaust valve is changed. Therefore, with the internal combustion engine disclosed in the aforementioned patent application, when the idle speed decreases temporarily, it is possible that, even if the opening and closing timing of the electromagnetically driven valves were changed to compensate for that decrease, engine stall may not be prevented if the intake line pressure were sufficiently low.

SUMMARY OF THE INVENTION

In order to solve the foregoing problem, it is an object of this invention to provided a control system of an internal combustion engine that can appropriately return an engine speed to a desired speed, when the engine speed has decreased from that desired speed, regardless of intake line pressure.

In order to achieve the foregoing object, a control system of an internal combustion engine according to a first aspect of the invention is provided with a variable valve train that can change opening and closing characteristics of at least one of an intake valve and an exhaust valve, an intake control mechanism that controls an intake air volume flowing through an intake passage, and a controller. The controller controls the variable valve train so as to increase a torque of the internal combustion engine when the engine speed falls below a desired speed, and controls the intake control mechanism so as to increase the intake air volume when the engine speed falls below the desired speed while the intake line pressure is equal to, or less than, a predetermined pressure.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 4A–D are timing charts illustrating both the content of learning executed in the first exemplary embodiment of the invention, and the effects of that learning;

FIGS. 5A–I are timing charts illustrating the effects achieved by the system of the first exemplary embodiment of the invention;

DETAILED DESCRIPTION OF PREFERRED EMBODIMENTS

Figure 1:
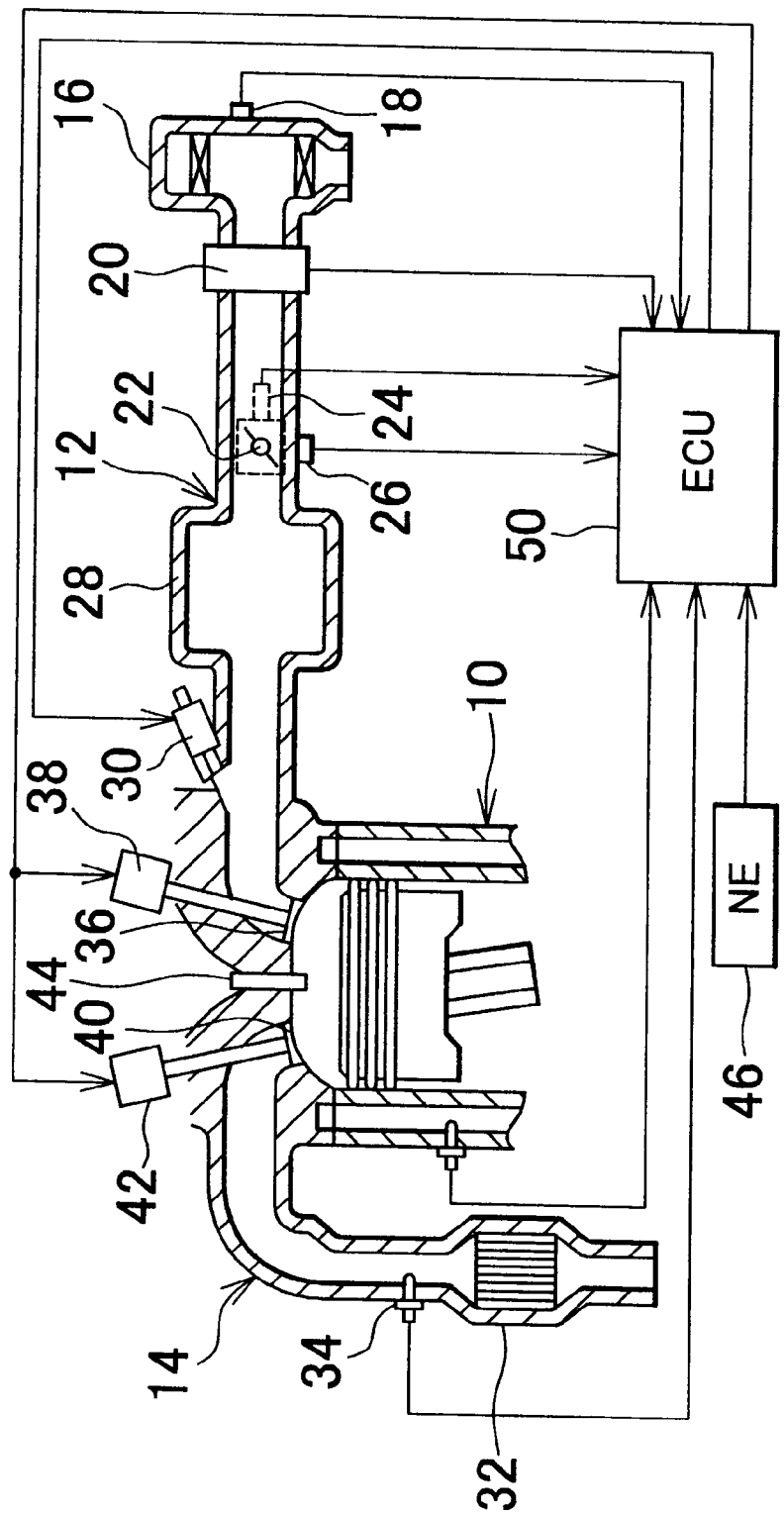
FIG. 1 is a view illustrating the construction of a first exemplary embodiment of the invention.

Hereinafter, exemplary embodiments of this invention will be described with reference to the accompanying drawings. In the drawings, like elements shall be denoted by like reference numerals, and descriptions thereof will be omitted.

First Embodiment

Referring to FIG. 1, a system according to a first exemplary embodiment of the invention is provided with an internal combustion engine 10, to which an intake passage 12 and an exhaust passage 14 are both communicated. The intake passage 12 has an air filter 16 provided at the end portion on the upstream side. An intake air temperature sensor 18 is attached to the air filter 16.

An airflow meter 20 is arranged downstream of the air filter 16. This airflow meter 20 detects an intake air volume GA flowing through the intake passage 12. Downstream of the airflow meter 20 is provided a throttle valve 22, which is an electronically controlled throttle valve capable of controlling the throttle opening independently of the accelerator opening. Near the throttle valve 22 are disposed a throttle sensor 24 that detects a throttle opening TA and an idle switch 26 that turns on when the throttle valve 22 is fully closed.

A surge tank 28 is provided downstream of the throttle valve 22. Also, further downstream of the surge tank 28 is arranged a fuel injection valve 30 for injecting fuel into an intake port of the internal combustion engine 10. A catalyst 32 is communicated to the exhaust passage 14. In addition, an exhaust $O_2$ sensor 34 is arranged upstream of this catalyst 32.

The internal combustion engine 10 includes an electromagnetically driven intake valve 38 that electromagnetically operates an intake valve 36, and an electromagnetically driven exhaust valve 42 that electromagnetically operates an exhaust valve 40. Further, a spark plug 44, the tip of which is exposed inside a cylinder, and a rotation sensor 46 that detects an engine speed NE are attached to the internal combustion engine 10.

As shown in FIG. 1, the system according to this exemplary embodiment is provided with an ECU (Electronic Control Unit) 50 to which the various aforementioned sensors are connected. Further, the fuel injection valve 30, the electromagnetically driven intake valve 38, and the electromagnetically driven exhaust valve 42 and the like are all controlled by this ECU 50. In addition, the spark plug 44 creates a spark at a timing determined by the ECU 50.

When de-energized, the electromagnetically driven intake valve 38 keeps the intake valve 36 in a neutral position, i.e., a half-open position. Upon receiving a drive signal from the ECU 50, the electromagnetically driven intake valve 38 can then move the intake valve 36 to a fully open or a fully closed position. In this same way, when de-energized, the electromagnetically driven exhaust valve 42 keeps the exhaust valve 40 in a neutral position, i.e., a half-open position. Upon receiving a drive signal from the ECU 50, the electromagnetically driven exhaust valve 42 can then move the exhaust valve 40 to a fully open or a fully closed position.

Next, operation of the system according to the first exemplary embodiment will be described with reference to FIGS. 2 through 5.

The internal combustion engine 10 according to the first exemplary embodiment is provided with the electromagnetically driven intake valve 38 and the electromagnetically driven exhaust valve 42, as described above. The electromagnetically driven intake valve 38 and the electromagnetically driven exhaust valve 42 are able to open the intake valve 36 and the exhaust valve 40, respectively, irrespective of the crank angle of the internal combustion engine 10. Accordingly, the electromagnetically driven intake valve 38 and the electromagnetically driven exhaust valve 42 are able to function as a variable valve train that changes the opening and closing timing of the intake valve 36 and the exhaust valve 40 in accordance with the operating condition of the internal combustion engine 10.

Because the electromagnetically driven intake valve 38 and the electromagnetically driven exhaust valve 42 can be controlled to change the opening and closing timing of the intake valve 36 and the exhaust valve 40, respectively, it is possible to substantially change the volume of air drawn into the internal combustion engine 10. For example, if the idle speed of the internal combustion engine 10 decreases, the electromagnetically driven intake valve 38 and the electromagnetically driven exhaust valve 42 can be controlled appropriately to increase an intake air volume GA and return the idle speed to a desired speed. Hereinafter, this function shall be generally referred to as the "first function" realized by the system according to this exemplary embodiment.

According to the internal combustion engine 10 in this exemplary embodiment, the intake air volume GA is controlled by both the opening and closing timing of the intake valve 36 and the exhaust valve 40, as well as by the throttle opening TA of the throttle valve 22. That is, when the throttle valve 22 is open wide and an intake line pressure PM is sufficiently high (near atmospheric pressure), the intake air volume GA is mainly controlled by the opening and closing timing of the intake valve 36 and the exhaust valve 40. On the other hand, when the throttle opening TA is slight and the intake line pressure PM is sufficiently low, the intake air volume GA will not change much even if the opening and closing timing of the intake valve 36 and the exhaust valve 40 are changed.

Therefore, when the intake line pressure PM is sufficiently low, e.g., when the idle speed decreases, simply changing the opening and closing timing of the intake valve 36 and the exhaust valve 40 is insufficient to increase the engine speed by increasing the intake air volume GA. The throttle opening TA must be also increased. In other words, according to the system of this exemplary embodiment, when the idle speed decreases, e.g., when the intake line pressure PM is sufficiently low, the intake air volume GA can be increased by increasing the throttle opening TA. This enables the idle speed to be returned to the desired speed. Hereinafter, this function shall be generally referred to as the "second function" realized by the system according to this exemplary embodiment.

Figure 2:
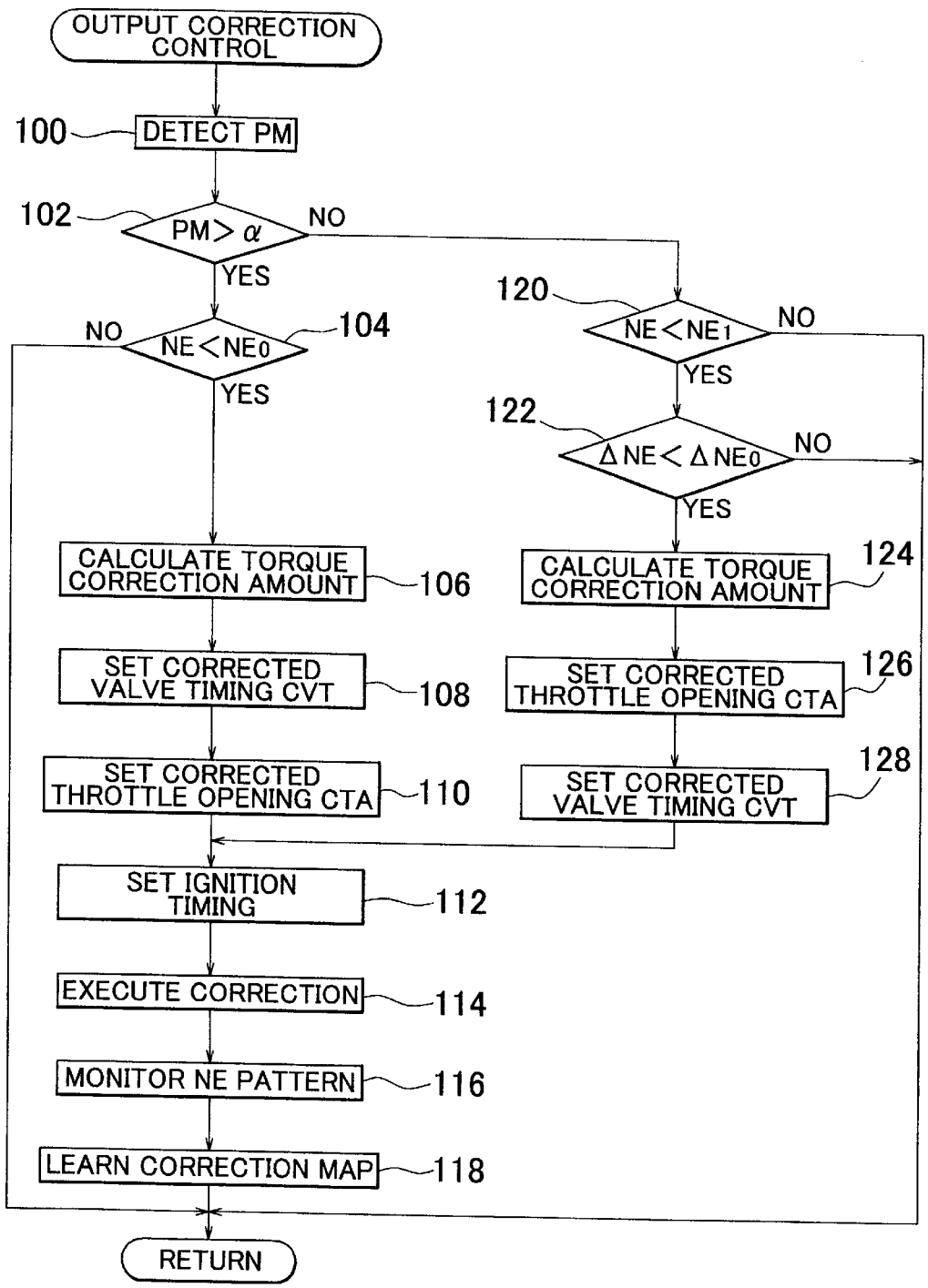
FIG. 2 is a flowchart of an output correction control routine executed in the first exemplary embodiment of the invention.

FIG. 2 is a flowchart of the output correction control routine that the ECU 50 executes to realize the aforementioned first and second functions.

In the routine shown in FIG. 2, the intake line pressure PM is first detected (Step 100).

The intake line pressure PM can be estimated based on the intake air volume GA detected by the airflow meter 20 using a well-known method. Alternatively, an intake air pressure sensor may be provided in the intake passage 12 and the intake line pressure PM may be measured by this sensor.

Next, it is determined whether the intake line pressure PM is greater than a predetermined pressure α (corresponding to a predetermined negative pressure that is lower than atmospheric pressure) (Step 102).

The determined pressure α is a lower limit of the intake line pressure PM in which the volume of air actually drawn into the internal combustion engine 10 is controlled by the opening and closing timing of the intake valve 36 and the exhaust valve 40. Accordingly, when it is determined that $PM>\alpha$, it can be determined that it is possible to substantially increase the intake air volume just by changing the opening and closing timing of the intake valve 36 and the exhaust valve 40 without increasing the throttle opening TA.

In the routine shown in FIG. 2, when it has been determined that $PM>\alpha$, it is next determined whether the engine speed NE is less than a first determined value $NE_0$ (Step 104).

This first determined value $NE_0$ is a value (a value that is slightly less than the target idle speed) that is used to determined whether the internal combustion engine 10 may stall. That is, when it is determined that the engine speed NE is not less than first determined value $N_0$, it can be determined that the internal combustion engine 10 will not stall immediately thereafter. In this case, there is no need to increase the output (torque) of the internal combustion engine 10 so the current cycle of the routine ends quickly.

On the other hand, when it is determined in Step 104 that $NE<NE_0$, it is determined that the internal combustion engine 10 may stall. In this case, the torque correction amount necessary to return the engine speed NE to the target idle speed is then calculated (Step 106).

The ECU 50 stores a map that establishes the relationship between the decrease amount of the engine speed NE with respect to the target idle speed and the torque correction amount (increase amount) necessary for returning the engine speed NE to the target idle speed. In Step 106 the torque correction amount is calculated with reference to this map.

Next, a corrected valve timing CVT to achieve the torque correction amount calculated in Step 106 is set (Step 108).

Figures 3A, 3B:
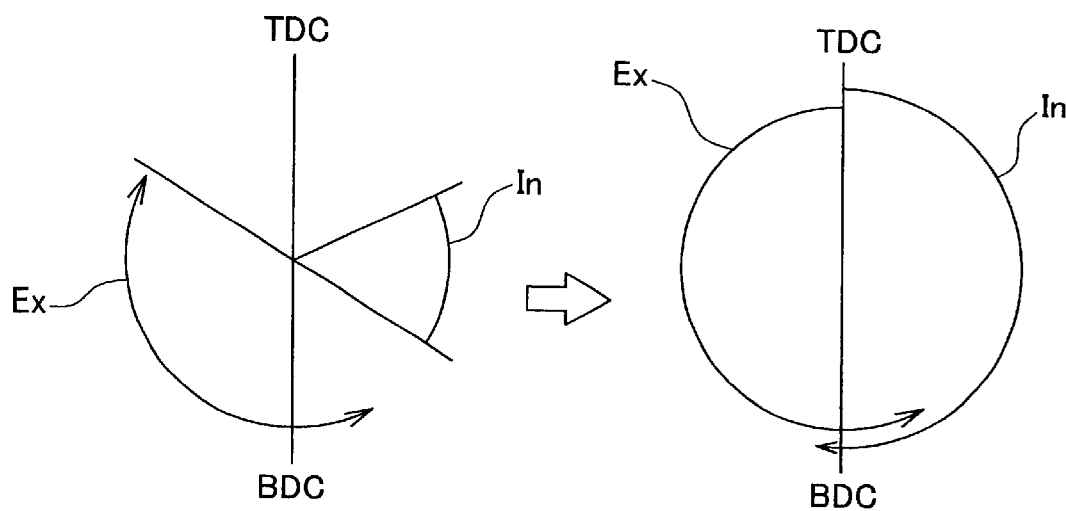
FIGS. 3A–B illustrate an example of valve timing correction executed in the first exemplary embodiment of the invention.

FIGS. 3A and 3B show examples comparing valve timing before and after correction. In these figures, the area denoted by "In" is the period during which the intake valve 36 is open, while the area denoted by "Ex" is the period during which the exhaust valve 40 is open. Also in the figures, "TDC" stands for "Top Dead Center" and "BDC" stands for "Bottom Dead Center".

A map is stored in the ECU 50 that establishes the valve timing of the intake valve 36 and the exhaust valve 40 by the relationship between the torque correction amount to be realized and the intake line pressure PM. In Step 108, the valve timing is set to achieve the torque correction amount calculated in Step 106 with reference to the map, based on the intake line pressure PM detected in Step 100. As a result, when a torque increase is required, the valve timing shown in FIG. 3A is corrected to the valve timing shown in FIG. 3B, for example.

According to the routine shown in FIG. 2, after the corrected valve timing CVT is set, a corrected throttle opening CTA is then set (Step 110).

The ECU 50 stores a map of the throttle opening established by the relationship between the valve timing of the intake valve 36 and the exhaust valve 40 and the intake line pressure PM and the like. In Step 110, the corrected throttle opening CTA is set with reference to this map so as to match the corrected valve timing CVT set in Step 108.

Next, the ignition timing is set to correspond to the corrected valve timing CVT and the corrected throttle opening CTA (Step 112).

Ordinarily, the ignition timing is determined with respect to the load ratio (intake air volume GA) of the internal combustion engine 10. When the valve timing of the intake valve 36 and the exhaust valve 40 are switched to the corrected valve timing CVT set in Step 108, however, the load ratio instantaneously changes and that change is large. As a result, if the ignition timing is set based on this load ratio under this type of condition, it is unable to be set appropriately such that the planned torque increase may be unable to be achieved. Therefore, according to this exemplary embodiment, when the corrected valve timing CVT is used, the ignition timing is set based on the target torque to be generated using that corrected valve timing CVT.

The ECU 50 stores a map establishing the relationship between the target torque to be generated by the internal combustion engine 10 and a MBT (i.e., Minimum spark advance for Best Torque). In Step 112, the MBT is calculated with reference to this map. The MBT is then compared with a knock limit point. When the MBT is retarded with respect to the knock limit point, that MBT is set as the ignition timing. On the other hand, when the MBT is advanced with respect to the knock limit point, that knock limit point is set as the ignition timing.

Next, in the routine shown in FIG. 2, a correction using the corrected valve timing CVT, the corrected throttle opening CTA, and the ignition timing, all set as described above, is executed (Step 114).

As a result, the torque of the internal combustion engine 10 increases and the engine speed NE, which had decreased, is increased to the target idle speed.

With the system according to the first exemplary embodiment, when the torque is increased by one of the variable valve train and the intake control mechanism, an ignition timing that is suitable for that condition can be set. As a result, according to the invention, it is possible to effectively avoid a situation in which a desired torque increase is not generated due to the use of an inappropriate ignition timing.

With the system according to this exemplary embodiment, when the correction using the corrected valve timing CVT and the like is started, the change pattern of the engine speed NE is then monitored (Step 116).

Then, the results of that monitoring are compared with an ideal change pattern and the map to obtain the torque correction amount (see Step 106) so that the engine speed NE that comes close to the target idle speed is learned (Step 118).

FIG. 4 is a timing chart illustrating both that learning content, and the effects from that learning.

FIG. 4(A) shows a comparison between a change (solid line) in the engine speed NE before and after the correction and the ideal engine speed change (broken line) with insufficient learning. FIG. 4(B) shows a waveform of the torque correction amount used during that correction. In this example, using the torque correction amount shown in FIG. 4(B) makes the engine speed NE increase too much with respect to the ideal change after the correction.

In this case (in Step 118), the map of the torque correction amount is corrected so that the torque correction amount used in the current cycle of the routine is less to make the increase in the engine speed NE more gradual.

FIG. 4(C) shows a change in the engine speed NE before and after another correction in accordance with the corrected map. FIG. 4(D) shows a comparison between the torque correction amount (solid line) used at that time and a torque correction amount (broken line) used when the learning is insufficient. As shown in these figures, with the system according to the exemplary embodiment, when the engine speed NE shows excessive change after the correction, the torque correction amount is corrected such that that change comes close to the ideal change. As a result, the change pattern of the engine speed NE after the correction comes close to the ideal change pattern. Therefore, with the system according to this exemplary embodiment, it is possible to return the engine speed NE quickly to the target idle speed, without causing hunting in the control, by correcting using the corrected valve timing CVT and the corrected throttle opening CTA.

That is, the system according to the exemplary embodiment makes it possible to increase the stability of the engine speed NE.

The system according to this exemplary embodiment makes a correction following an increase in the throttle opening TA when there is a decrease in the engine speed NE when the intake line pressure PM exceeds a predetermined pressure $\alpha$.

In the routine shown in FIG. 2, when it has been determined in Step 102 that the intake line pressure PM is not greater than $\alpha$, it is next determined whether the engine speed NE is lower than a second determined value $NE_1$ (Step 120).

The second determined value $NE_1$ is a value that is large compared with the first determined value $NE_0$, and is used in determining whether the internal combustion engine 10 may stall when the intake line pressure PM is equal to, or less than, $\alpha$. Accordingly, when it has been determined that the engine speed NE is not less than the second determined value $NE_1$, it is determined that the internal combustion engine 10 will not stall so that there is no need to increase the torque of the internal combustion engine 10. In this case, the current cycle of the routine ends at this point.

On the other hand, when it has been determined in Step 120 that $NE<NE_1$, it is then determined whether a change amount $\Delta NE$ of the engine speed NE (i.e., a value which is the difference between the engine speed NE at the time of the current cycle of the routine and the engine speed NE at the time of the last cycle of the routine; it is a negative value when the engine speed NE decreases) is less than a predetermined value $\Delta NE_0$(a negative value) (Step 122).

The determined value $\Delta NE_0$ is a value used in determining whether the decrease pattern of the engine speed NE is sudden enough to cause engine stall. Accordingly, when it has been determined that the change amount $\Delta NE$ is not less than the determined valve $\Delta NE_0$, it is determined that the internal combustion engine 10 will not stall so it is not necessary to increase the torque of the internal combustion engine 10. In this case, the current cycle of the routine ends quickly at this point.

On the other hand, when it has been determined in Step 122 that $\Delta NE<\Delta NE_0$, it can be determined that the internal combustion engine 10 may stall. In this case, a torque correction amount necessary to return the engine speed NE to the target idle speed is then calculated according to the same method as in Step 106 (Step 124).

Next, the corrected throttle opening CTA is set to realize the torque correction amount calculated in Step 124 (Step 126).

A map that establishes the throttle opening TA by the relationship with the torque correction amount to be realized is stored in the ECU 50. In Step 126, the throttle opening TA to achieve the torque correction amount calculated in Step 124 is set with reference to that map.

In the routine shown in FIG. 2, after the corrected throttle opening CTA is set, the corrected valve timing CVT is set (Step 128).

The ECU 50 stores a map of the valve timing of the intake valve 36 and the exhaust valve 40 set by the relationship between the throttle opening TA and the intake line pressure PM and the like. In Step 128, the corrected valve timing CVT is set with reference to that map so as to match the corrected throttle opening CTA set in Step 126.

Thereafter, the processes in Step 112 onward are executed using the corrected throttle opening CTA and the corrected valve timing CVT set in Steps 126 and 128, respectively. As a result, a correction following a drastic increase in the throttle opening TA is executed. When the intake line pressure PM is less than the determined pressure $\alpha$, simply changing the valve timing of the intake valve 36 and the exhaust valve 40 is not enough to affect a large change in the intake air volume GA. In contrast, according to the system of this exemplary embodiment, when the engine speed NE decreases, that engine speed NE is able return to the appropriate target idle speed by increasing the intake air volume instantaneously, regardless of the intake line pressure PM.

As described above, with the system according to the exemplary embodiment, when the intake line pressure PM is high (i.e., when PM>$\alpha$ is true), the valve timing and the like is corrected at the point when the engine speed NE becomes less than the first determined value $NE_0$ (see Steps 102 and 104 and the like). On the other hand, when the intake line pressure PM is low (i.e., when PM>$\alpha$ is not true), the throttle opening and the like starts to correct at the point when the engine speed NE becomes less than the second determined value $NE_1$, on the condition that $\Delta NE$ is below $\Delta NE_0$ (see Steps 102, 120, 122 and the like).

That is, according to the exemplary embodiment, the condition for starting the correction when the intake line pressure PM is low is fulfilled more easily than the condition for starting the correction when that intake line pressure PM is high. Therefore, the correction to increase the torque of the internal combustion engine 10 starts earlier when the intake line pressure PM is low than when the intake line pressure PM is high.

FIGS. 5A though 5I are timing charts illustrating the effects obtained by the foregoing function.

More specifically, FIGS. 5A through 5C are timing charts illustrating the changes brought about in the engine speed NE, the target torque, and the intake air volume GA when a correction is executed in this exemplary embodiment while the intake line pressure PM exceeds the determined pressure $\alpha$. While the intake line pressure PM exceeds the $\alpha$, the intake air volume GA can be changed instantaneously by changing the valve timing of the intake valve 36 and the exhaust valve 40. Therefore, under this condition, if the target torque is increased and the valve timing is corrected at the point when the engine speed NE falls below first determined value $NE_0$ (see FIG. 5B), the intake air volume GA starts to increase quickly from that point (see FIG. 5C). As a result, the engine speed NE converges quickly on the target idle speed (see FIG. 5A).

FIG. 5D through FIG. 5F are timing charts illustrating the changes brought about in the engine speed NE, the target torque, and the intake air volume GA when, under the initial condition that the intake line pressure PM is not greater than $\alpha$, the throttle opening. TA is corrected at a timing that is the same as the timing at which the intake line pressure PM becomes greater than $\alpha$. Hereinafter, this example will be referred to as a "comparative example". In order to increase the intake air volume GA when the intake line pressure PM is not greater than $\alpha$, it is necessary to increase the throttle opening TA. Also, after increasing the throttle opening TA, there is a certain amount of lag time until the intake air volume GA actually increases. Therefore, when the intake line pressure PM is low, even if the target torque is increased when the engine speed NE falls below the first determined value $NE_0$, as in the comparative example, (see FIG. 5B), the engine speed NE may actually be quite a bit lower than the first determined value $NE_0$ (see FIG. 5A) at the point when the intake air volume GA actually starts to increase (see FIG. 5C). In this case, there is a tendency for the internal combustion engine 10 to stall. Further, the engine speed NE tends to take a long time until it converges on the target idle speed.

FIGS. 5G through 5I are timing charts illustrating the changes brought about in the engine speed NE, the target torque, and the intake air volume GA when the system according to this exemplary embodiment executes a correction under the condition that the intake line pressure PM is not greater than α. According to this exemplary embodiment, as described above, when the intake line pressure PM is not greater than α, the target torque starts to correct at the point where the engine speed NE falls below the second determined value $NE_1$ (see FIG. 5H). That is, according to the system in this exemplary embodiment, when the intake line pressure PM is equal to, or less than α, the target torque is corrected and the throttle opening TA can begin to be increased before the engine speed NE falls to first determined value $NE_0$. As a result, when the engine speed NE falls slightly below the target idle speed, the intake air volume GA can be increased to restore it (FIG. 5I). Therefore, according to the system of this exemplary embodiment, even if the intake line pressure PM is not greater than the α, it is possible to return the engine speed NE that has fallen below the target idle speed to the target idle speed quickly, converging the engine speed NE with the target idle speed.

As described above, with the system according to this exemplary embodiment, when the engine speed NE falls below the target idle speed, that engine speed NE can be returned quickly and appropriately to the target idle speed regardless of the intake line pressure PM.

Also according to the system of the exemplary embodiment, the condition for executing the correction to increase the torque by the intake control mechanism is set so that it can be fulfilled more easily than the condition for executing the correction to increase the torque by the variable valve train. Therefore, the engine speed can be quickly returned to the desired speed even when increasing the torque with the intake control mechanism, regardless of whether the intake control mechanism is less responsive than the variable valve train.

In the system according to this exemplary embodiment, it is possible to operate only one or some (i.e., a submaximal number) of a plurality of the valves provided in the individual cylinders and to stop the remaining at least one valve. More specifically, it is possible, for example, to operate one of the two intake valves 36 disposed in each of the cylinders while stopping the other two intake valves 36. In the description of Step 108, the number of valves operated when setting the corrected valve timing CVT was not taken into consideration. In this exemplary embodiment, however, the number of valves operated in the individual cylinders when setting the corrected valve timing CVT may be taken into consideration.

Figure 6B:
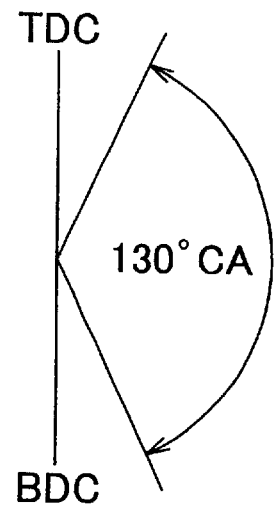
FIGS. 6A–C illustrate a modified example of the valve timing correction executed in the first exemplary embodiment of the invention.
Figure 6A:
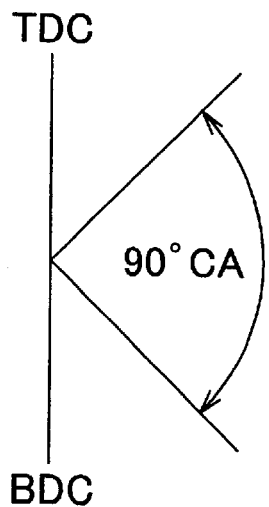
Figure 6C:
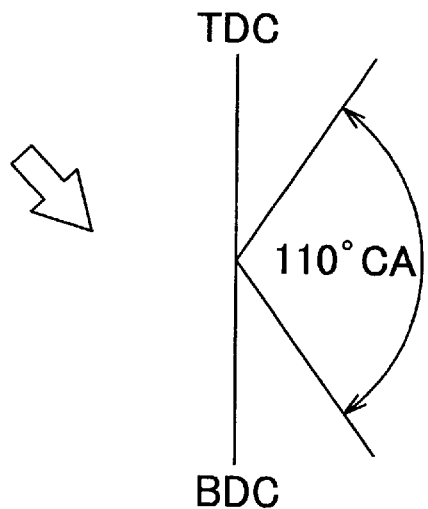

FIGS. 6A through 6C illustrate one example of a method to set the corrected valve timing CVT of the intake valve 36 while taking the number of valves operated into consideration. More specifically, FIG. 6A is a view showing the open period of the intake valve 36 before the correction. FIG. 6B is a view showing the corrected valve timing CVT when only one of the intake valves 36 is to be operated after the correction, while FIG. 6C shows the corrected valve timing CVT when two of the intake valves 36 are to be operated after the correction. In these figures, when there is just one valve operated, the open period (i.e., operation angle) is 130°CA (Crank Angle). When there are two operated valves, the open period is 110°CA.

In this way, when the open period of the intake valve 36 is increased, it is possible to minimize a difference in the amount of increase in the intake air volume GA according to the number of operated valves when only one valve is operated as opposed to when two valves are operated. Therefore, according to this method for setting the corrected valve timing CVT, it is possible to control the engine speed NE so that it is stable without causing hunting in the control.

Also according to the foregoing first exemplary embodiment, the throttle valve 22 is provided as a mechanism to control the air volume flowing into the intake passage 12, i.e., as a mechanism to control the intake line pressure PM. This mechanism, however, is not limited to the throttle valve 22. That is, the mechanism controlling the air volume flowing into the intake passage may also be an idle speed control valve (ISCV).

Further, according to the first exemplary embodiment, the combination of the throttle valve and the electromagnetically driven intake valve 38 and the electromagnetically driven exhaust valve 42 enables the output of the internal combustion engine 10 to be corrected mainly with the valve timing when the intake line pressure PM is high, and mainly with the throttle opening TA when the intake line pressure PM is low. This invention is not limited to this combination. That is, this function may also be achieved by a combination of the throttle valve and a mechanical variable valve train.

In the first exemplary embodiment, the electromagnetically driven intake valve 38 and the electromagnetically driven exhaust valve 42 correspond to a "variable valve train", and the throttle valve 22 corresponds to a "intake control mechanism". Likewise, a "variable valve train control portion" is realized by the ECU 50 executing the processes in Steps 108 and 128, and a "intake control mechanism control portion" is realized by the ECU 50 executing the process in Step 126.

Moreover, in the first exemplary embodiment, a "speed change detecting portion" is realized by the ECU 50 executing the process in Step 116, and a "learning portion" is realized by the ECU 50 executing the process in Step 118.

Second Embodiment

Next, a second exemplary embodiment of the invention shall be described with reference to FIG. 7.

Figure 7:
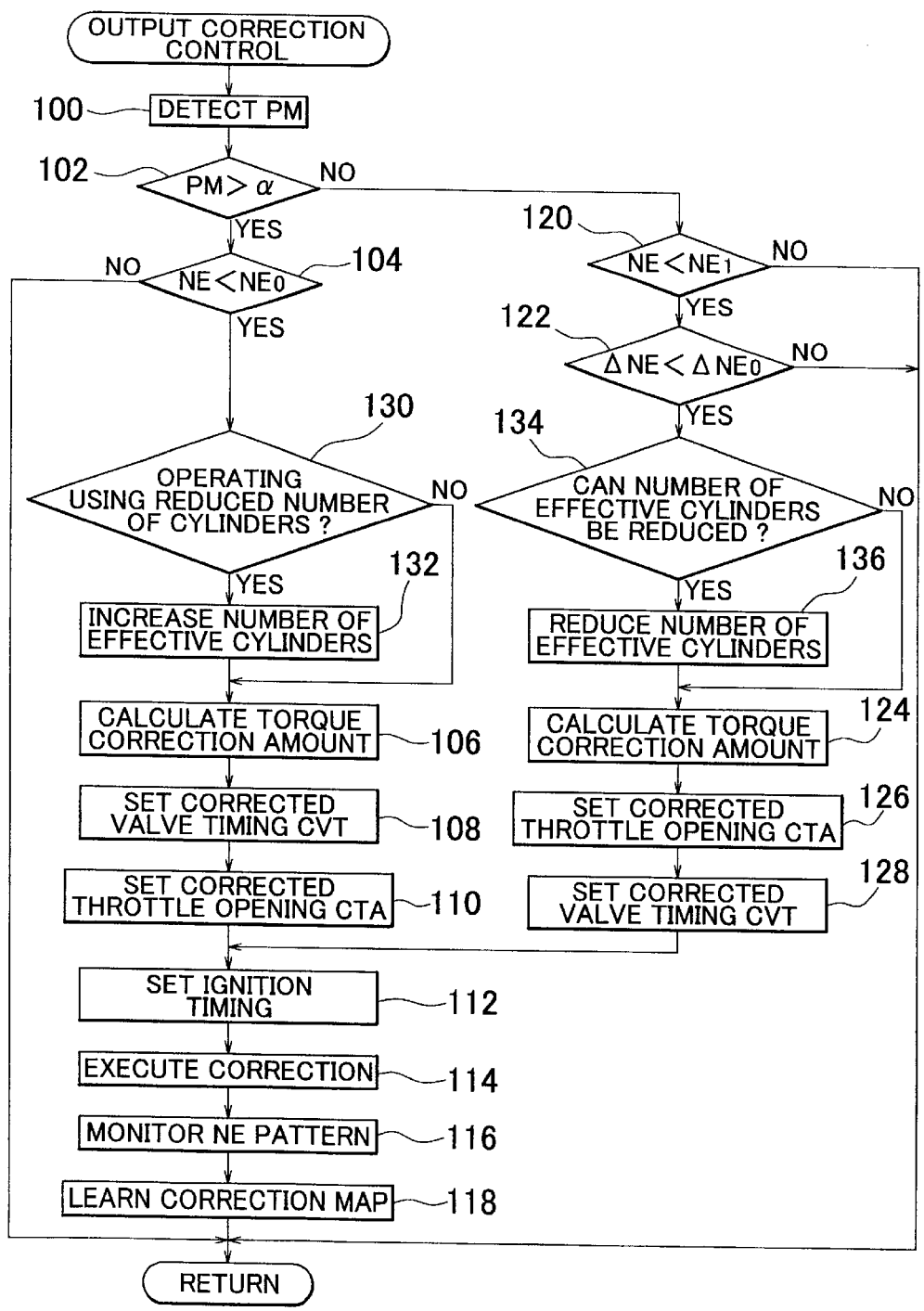
FIG. 7 is a flowchart of an output correction control routine executed in a second exemplary embodiment of the invention.

A system according to the second exemplary embodiment of the invention can be realized by having the ECU 50 execute the routine shown in FIG. 7.

FIG. 7 is a flowchart of an output correction routine that the ECU 50 executes in this exemplary embodiment to increase the output of the internal combustion engine 10 when the engine speed NE decreases. The routine shown in FIG. 7 is similar to the routine shown in FIG. 2 except that Steps 130 and 132 have been inserted between Steps 104 and 106, and that Steps 134 and 136 have been inserted between Steps 122 and 124. Hereinafter, the steps in FIG. 7 that are the same as steps in FIG. 2 shall be denoted by the same reference numerals, and descriptions thereof shall be omitted.

That is, in the routine shown in FIG. 7, when it has been determined in Step 104 that the engine speed NE has decreased, or more specifically, when the engine speed NE falls to the first determined value $NE_0$ while the intake line pressure PM exceeds α, it is determined whether the engine is operating with a reduced number of its cylinders (Step 130).

In this exemplary embodiment, the internal combustion engine 10 is able to run in a mode in which only one or some (i.e., a submaximal number) of its cylinders are working while the remaining at least one cylinder is not. That is, the internal combustion engine 10 is able to operate with a reduced number of its cylinders (i.e., reduced cylinder operation). In Step 130, it is determined whether the internal combustion engine 10 is running in this state.

When it has been determined in Step 130 that the internal combustion engine 10 is operating with a reduced number of its cylinders, a process is executed to increase the number of the cylinders that are working, i.e., the effective cylinders (Step 132).

On the other hand, when it has been determined that the engine is operating using all of its cylinders, the process in Step 132 is skipped because the number of effective cylinders can not be increased.

Thereafter, the processes of Step 106 onward are executed just as in the first exemplary embodiment.

When the intake line pressure PM exceeds the determined pressure α, the air volume that each of the effective cylinders is able to draw in is not greatly decreased even if the number of effective cylinders is increased. Therefore, in this case, increasing the number of effective cylinders increases the number of cylinders generating output without reducing the output of the individual cylinders. As a result, it is possible to increase the overall output of the internal combustion engine 10. Therefore, according to the system of this exemplary embodiment, if the engine speed NE falls while the internal combustion engine 10 is operating with a reduced number of its cylinders, that engine speed NE is quickly able to be increased.

Also in the routine shown in FIG. 7, when it has been determined by the processes in Steps 120 and 122 that the engine speed NE has fallen. Or more specifically, when the engine speed NE rapidly falls to the second determined value $NE_1$ while the intake line pressure PM is equal to, or less than α, it is determined whether the number of effective cylinders can be reduced (Step 134).

When it has been determined that the number of effective cylinders can be reduced, the process to reduce the number of effective cylinders is executed (Step 136).

On the other hand, when it has been determined that the number of effective cylinders can not be reduced, the process in Step 136 is skipped because it is not possible to reduce the number of effective cylinders.

Thereafter, the processes of Step 124 onward are executed just as in the first exemplary embodiment.

When the intake line pressure PM is equal to, or less than, the determined pressure α, i.e., when the intake line pressure PM is substantially low, the air volume that each of the effective cylinders is able to draw in can be increased by reducing the number of effective cylinders. When the number of effective cylinders is increased under these conditions, however, the volume of air drawn into each of the effective cylinders further decreases such that the engine may stall. Therefore in this case, it is effective to decrease the number of effective cylinders and increase the engine speed NE for a moment to return the engine speed NE to the target idle speed.

According to the system in this exemplary embodiment, as described above, when the intake line pressure PM is low, the number of effective cylinders is reduced to match the decrease in the engine speed NE. Therefore, with the system according to the exemplary embodiment, it is possible to quickly increase the decreased engine speed NE even in this kind of case.

In the second exemplary embodiment the "effective cylinder increase portion" is realized by the ECU 50 executing the process in Step 132, and the "effective cylinder reduction portion" is realized by the ECU 50 executing the process in Step 136.

Third Embodiment

Next, a third exemplary embodiment according to the invention shall be described with reference to FIG. 8.

Figure 8:
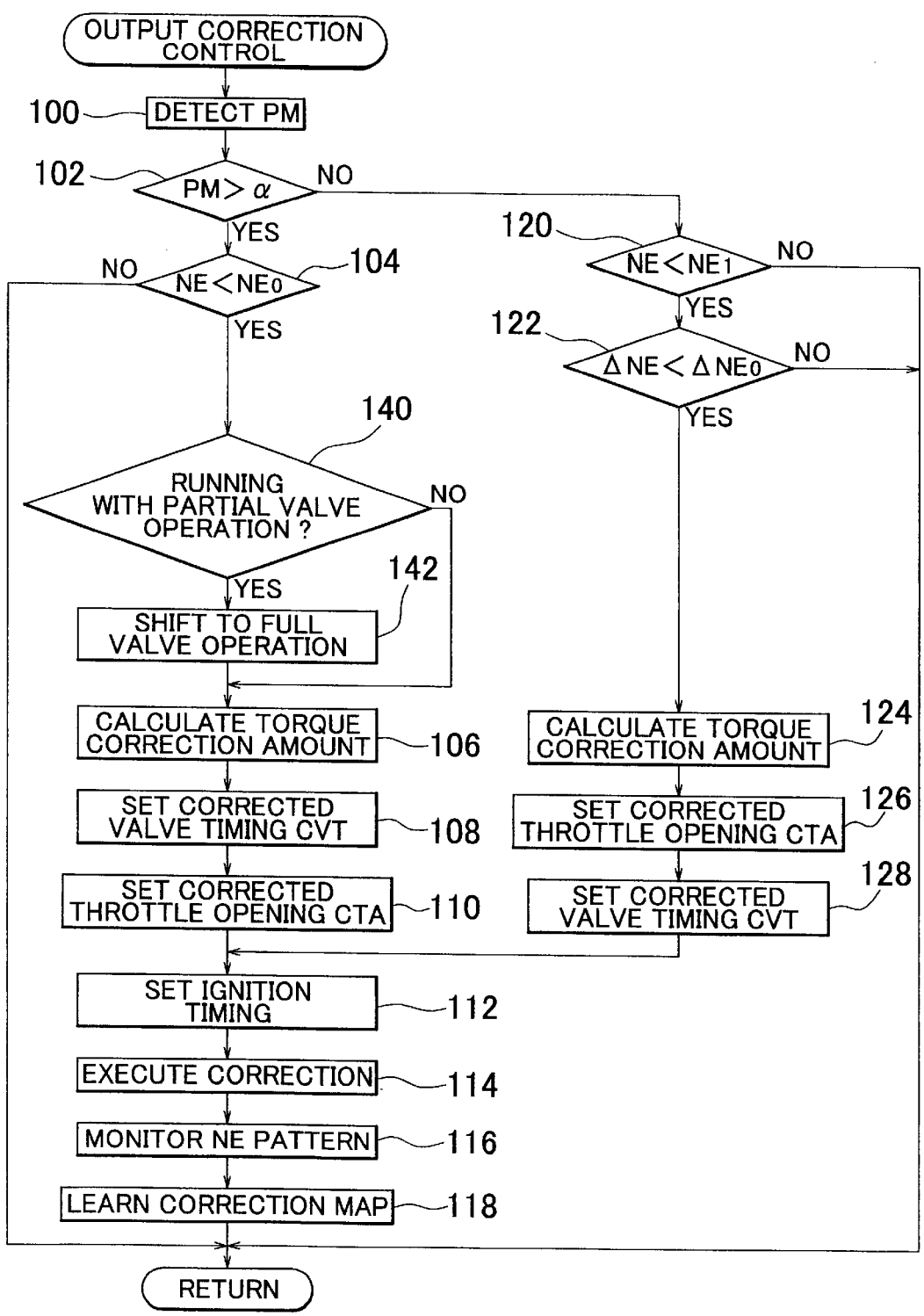
FIG. 8 is a flowchart of an output correction control routine executed in a third exemplary embodiment of the invention.

The system according to the third exemplary embodiment of the invention can be realized by having the ECU 50 execute the routine shown in FIG. 8. In addition to the elements shown in FIG. 1, the system of this exemplary embodiment is also provided with an alternator that operates according to a load from power consumption following operation of the internal combustion engine 10.

FIG. 8 is a flowchart of an output correction routine that the ECU 50 executes in this exemplary embodiment to increase the output of the internal combustion engine 10 when the engine speed NE decreases. The routine shown in FIG. 8 is similar to the routine shown in FIG. 2 except that Steps 140 and 142 have been inserted between Steps 104 and 106. Hereinafter, the steps in FIG. 8 that are the same as steps in FIG. 2 shall be denoted by the same reference numerals, and descriptions thereof shall be omitted.

That is, in the routine shown in FIG. 8, when it has been determined in Step 104 that the engine speed NE has decreased, or more specifically, when the engine speed NE falls to the first determined value $NE_0$ while the intake line pressure PM exceeds α, it is determined whether the engine is operating using only one or some (i.e., using a submaximal number) of its valves (Step 140).

In this exemplary embodiment, the internal combustion engine 10 is able to run in a mode in which only one or some of the plurality of intake valves 36 (or exhaust valves 40) arranged in each of the cylinders is operated while the other valve is stopped. More specifically, the internal combustion engine 10 is able to operate using only one of the two intake valves 36 (or exhaust valves 40) while the other valve is stopped, i.e., the internal combustion engine 10 is able to run with partial valve operation. In Step 140, it is determined whether the internal combustion engine 10 is running in this state.

When it has been determined in Step 140 whether the internal combustion engine 10 is running with partial valve operation, a process to shift from partial valve operation to full valve operation is executed to increase the number of valves opening and closing (Step 142).

On the other hand, when it has been determined that the internal combustion engine 10 is not running with partial valve operation, it is determined that the internal combustion engine 10 is running with full valve operation. In this case, the process in Step 142 is skipped.

Thereafter, the processes in Step 106 onward are executed just as in the first exemplary embodiment.

When the intake line pressure PM exceeds the determined pressure α, the air volume that each of the cylinders is able to draw in can be increased by shifting from partial valve operation to full valve operation. Therefore, in this case, shifting to full valve operation enables the output generated by each of the cylinders to be increased. As a result, with the system according to this exemplary embodiment, if the engine speed NE falls while the internal combustion engine 10 is operating with a reduced number of its cylinders, it is possible to quickly increase that engine speed NE.

In the system according to this exemplary embodiment, when the intake line pressure PM is not greater than $\alpha$, there is no great change in the volume of air drawn into each of the cylinders even if the internal combustion engine 10 is shifted from partial valve operation to full valve operation. Also, when that shift is performed, the power needed to drive the electromagnetically driven intake valve 38 and the electromagnetically driven exhaust valve 42 increases, which in turn increases the power generation load on the alternator. As a result, the internal combustion engine 10 is susceptible to stalling. Therefore, in the routine shown in FIG. 8, when it has been determined that the intake line pressure PM is not greater than $\alpha$, the internal combustion engine 10 will not be shifted to full valve operation even there has been a decrease in the engine speed NE.

According to this exemplary embodiment, however, when the intake line pressure PM is not greater than $\alpha$, the throttle opening TA is increased when the engine speed NE decreases, just as in the first exemplary embodiment (see Step 126). Then, after the throttle opening TA has increased sufficiently, the internal combustion engine 10 is shifted from partial valve operation to full valve operation to increase the overall output of the internal combustion engine 10. Therefore, the internal combustion engine 10 may also be shifted from partial valve operation to full valve operation after the intake line pressure PM exceeds $\alpha$, even if the intake line pressure PM was equal to, or less than, $\alpha$ when the engine speed NE fell.

In the third exemplary embodiment, the partial valve operation corresponds to "operating with a reduced number of the valves", and a "operating valve increase portion" is realized by the ECU 50 executing the process in Step 142.

Fourth Embodiment

Next, a fourth exemplary embodiment according to the invention shall be described with reference to FIG. 9.

Figure 9:
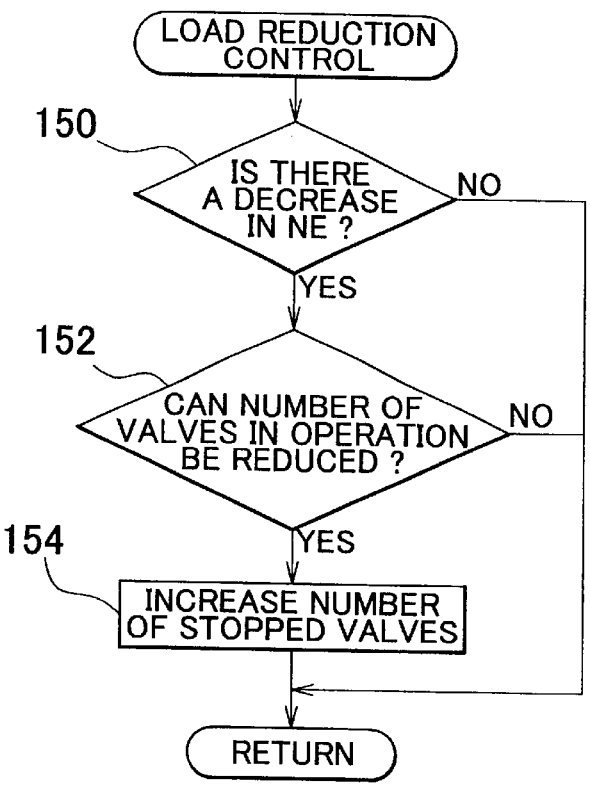
FIG. 9 is a flowchart of a load decrease control routine executed in a fourth exemplary embodiment of the invention.

The system according to the fourth exemplary embodiment is able to be realized by having the ECU 50 execute the routine shown in FIG. 9 in addition to the routine shown in FIG. 2 in the system of the first exemplary embodiment. In addition to the elements shown in FIG. 1, the system of this exemplary embodiment is also provided with an alternator that operates according to a load from power consumption following operation of the internal combustion engine 10.

FIG. 9 is a flowchart of a load reduction control routine that the ECU 50 executes in this exemplary embodiment to reduce the load on the internal combustion engine 10 when the engine speed NE decreases.

In the routine shown in FIG. 9, it is first determined whether there was a decrease in the engine speed NE (Step 150).

According to this exemplary embodiment, for example, a decrease in the engine speed NE is recognized when the engine speed NE becomes less than the first determined value $NE_0$.

When it has been determined in Step 150 that a decrease in the engine speed NE has not been recognized, the current routine immediately ends without proceeding to any other processes. On the other hand, when a decrease in the engine speed NE has been recognized, it is then determined whether it is possible to reduce the number of operating valves (Step 152).

The system according to this exemplary embodiment is capable of operating with a reduced number of its cylinders as effective cylinders, as well as operating using all of its cylinders as effective cylinders, just as in the third exemplary embodiment. Also, just as in the third exemplary embodiment, the system is capable of operating with a reduced number of its valves arranged in each cylinder (i.e., partial valve operation), as well as operating using all of its valves (i.e., full valve operation). In Step 152, it is determined whether it is possible to reduce the number of valves in operation even further by operating with a reduced number of the cylinders or by operating with a reduced number of the valves.

When it has been determined that it is possible to reduce the number of valves in operation, the number of valves stopped is increased (Step 154).

On the other hand, when it has been determined that the number of valves in operation can not be reduced, the process in Step 154 is skipped because the number of valves in operation can not be reduced.

As described above, according to the routine shown in FIG. 9, it is possible to reduce the number of valves in operation within the permissible range when the engine speed NE decreases. Reducing the number of operating valves reduces the power consumption from operating the internal combustion engine 10, which in turn reduces the load on the alternator. That is, with the system according to this exemplary embodiment, when it is possible to reduce the number of valves in operation, the load on the internal combustion engine 10 can be reduced at the same time the engine speed NE decreases. Therefore, with the system according to this exemplary embodiment, if the engine speed NE falls below the target idle speed, that engine speed NE can immediately be increased back to the target idle speed.

The system according to the fourth exemplary embodiment combines the function of reducing the load on the alternator by reducing the number of valves in operation when there is a decrease in the engine speed NE with the system of the first exemplary embodiment. Alternatively, however, this function may be combined with the system of the third exemplary embodiment.

That is, the system of the third exemplary embodiment, as described above, aims to restore the engine speed NE by increasing the number of valves in operation when the engine speed NE decreases while the intake line pressure PM is high (see FIG. 8). In this exemplary embodiment, the foregoing function (i.e., the function to reduce the number of valves in operation when the engine speed NE decreases) to be realized may also be used as a function to reduce the load on the alternator in order to increase the engine speed NE when it does not increase after the number of valves in operation have been increased by the system in the third exemplary embodiment. Using that function in this way enables the number of valves in operation to be selectively increased and reduced according to the actual situation so the engine speed NE can be restored more effectively.

In the foregoing fourth exemplary embodiment, the "operating valve reduction portion" is realized by having the ECU 50 execute the process in Step 154.

Fifth Embodiment

Next, a fifth exemplary embodiment according to the invention shall be described with reference to FIG. 10.

Figure 10:
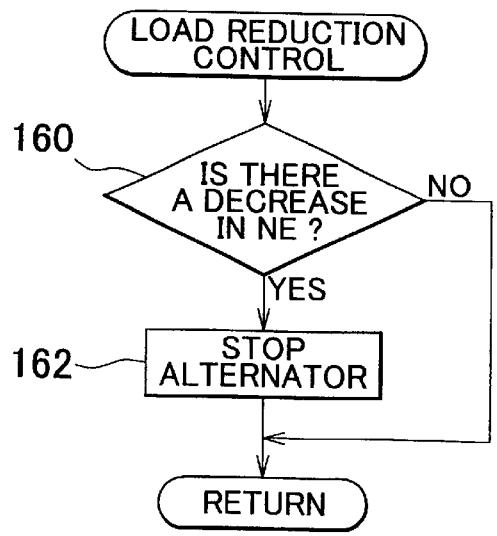
FIG. 10 is a flowchart of a load decrease control routine executed in a fifth exemplary embodiment of the invention.

The system according to this exemplary embodiment is able to be realized by having the ECU 50 execute the routine shown in FIG. 10 in addition to the routine shown in FIG. 2 in the system of the first exemplary embodiment. In addition to the elements shown in FIG. 1, however, the system of this exemplary embodiment is also provided with an alternator that operates according to a load from power consumption following operation of the internal combustion engine 10. Also, this alternator can arbitrarily be placed in a state where no load is applied thereto (i.e., a non-generating state) according to a command from the ECU 50.

FIG. 10 is a flowchart of a load reduction control routine that the ECU 50 executes in this exemplary embodiment to reduce the load on the internal combustion engine 10 when the engine speed NE decreases.

In the routine shown in FIG. 10, it is first determined whether the engine speed NE has decreased (Step 160).

According to this exemplary embodiment, a decrease in the engine speed NE may be recognized when the engine speed NE becomes lower than the first determined value $NE_0$, for example.

When it has been determined that a decrease in the engine speed NE has not been recognized, the current routine immediately ends without proceeding to any other processes. On the other hand, when a decrease in the engine speed NE has been recognized, it is then determined whether to stop the alternator (Step 162).

When the alternator is stopped, the load on the internal combustion engine 10 decreases and the engine speed NE increases. Therefore, with the system according to this exemplary embodiment, when the engine speed NE falls below the target idle speed, that engine speed NE can immediately be increased back to the target idle speed.

In the foregoing fifth exemplary embodiment, the "alternator stopping portion" is realized by the ECU 50 executing the process in Step 162.

In the illustrated embodiment, the controller (the ECU 50) is implemented as a programmed general purpose electronic control unit. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller can be a plurality of separate dedicated or programmable integrated or other electronic circuits or devices (e.g., hard-wired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the procedures described herein can be used as the controller. A distributed processing architecture can be used for maximum data/signal processing capability and speed.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

What is claimed is:

1. A control system of an engine, comprising:
a variable valve train that opens and closes at least one of an intake valve and an exhaust valve;
an intake control mechanism that controls an intake air volume flowing into an intake passage; and
a controller that:
controls the variable valve train so as to increase a torque of the engine when the engine speed falls below a desired speed; and
controls the intake control mechanism so as to increase the intake air volume when the engine speed falls below the desired speed while an intake line pressure is equal to, or less than, a predetermined pressure.

2. The control system of the engine according to claim 1, wherein:
a condition for controlling the intake control mechanism by the controller is satisfied more easily than a condition for increasing the torque of the engine when the intake line pressure is equal to, or less than, the predetermined pressure.

3. The control system of the engine according to claim 1, wherein:
when the intake line pressure is equal to, or less than, the predetermined pressure, the controller controls the intake control mechanism when the engine speed falls below a second determined value that is higher than a first determined value of a condition to control the variable valve train, and an amount of change in the engine speed becomes less than a desired determined value.

4. The control system of the engine according to claim 1, wherein the controller further:
detects a change in the engine speed after the torque of the engine has been increased by the controller; and
learns a level of the increase in the torque such that the change detected by the controller comes close to a target change.

5. The control system of the engine according to claim 1, wherein the controller further:
increases the number of cylinders in which the intake valve and the exhaust valve are operating by the variable valve train when the engine speed falls below the desired speed while the intake line pressure exceeds the predetermined pressure, while the engine is operating with a reduced number of the cylinders, in which the variable valve train operates the intake valve and the exhaust valve provided in a submaximal number of the cylinders and stops the intake valve and the exhaust valve provided in the remaining at least one cylinder; and
reduces the number of the cylinders in which the intake valve and the exhaust valve are operated by the variable valve train when the engine speed falls below the desired speed while the intake line pressure is equal to, or less than, the predetermined pressure.

6. The control system of the engine according to claim 1, wherein the controller further:
increases the number of valves to be operated when the engine speed falls below the desired speed while the intake line pressure exceeds the predetermined pressure, while the engine is operating with a reduced number of the valves, in which the variable valve train operates a submaximal number of a plurality of the valves provided in each of the cylinders and stops the remaining at least one valve.

7. The control system of the engine according to claim 1, wherein the controller further:
reduces the number of the valves to be operated by the variable valve train when the engine speed falls below the desired speed.

8. The control system of the engine according to claim 7, further comprising:
an alternator,
wherein the controller reduces the number of the valves to be operated by the variable valve train according to a load on the alternator.

9. The control system of the engine according to claim 1, further comprising:
an alternator; and
the controller that stops operation of the alternator when the engine speed falls below the desired speed.

10. The control system of the engine according to claim 1, wherein the controller further:
calculates a target torque, when the engine speed falls below the desired speed, to eliminate a decrease in the engine speed; and
sets an ignition timing based on the target torque.

11. A control system of an engine, comprising:
a variable valve train that opens and closes at least one of an intake valve and an exhaust valve;
an intake control mechanism that controls an intake air volume flowing into an intake passage; and
a controller having:
a variable valve train control routine portion that controls the variable valve train so as to increase a torque of the engine when an engine speed falls below a desired speed; and
an intake control mechanism control routine portion that controls the intake control mechanism so as to increase the intake air volume when the engine speed falls below the desired speed while an intake line pressure is equal to, or less than, a predetermined pressure.

12. A control method for an engine provided with a variable valve train that opens and closes at least one of an intake valve and an exhaust valve and a controller that controls an intake air volume flowing into an intake passage by the intake control mechanism, the control method comprising the steps of:
controlling the variable valve train so as to increase a torque of the engine when the engine speed falls below a desired speed; and
controlling the intake control mechanism so as to increase the intake air volume when the engine speed falls below the desired speed while an intake line pressure is equal to, or less than, a predetermined pressure.

13. The control method according to claim 12, wherein:
satisfying a condition for controlling the intake control mechanism by the controller is satisfied more easily than satisfying a condition for increasing the torque of the engine when the intake line pressure is equal to, or less than, the predetermined pressure.

14. The control method according to claim 12, wherein when the intake line pressure is equal to, or less than the predetermined pressure,
controlling the intake control mechanism when the engine speed falls below a second determined value that is higher than a first determined value of a condition provided for controlling the variable valve train, and an amount of change in the engine speed becomes less than a desired determined value.

15. The control method according to claim 12, further comprising the steps of:
detecting a change in the engine speed after the torque of the engine has been increased by the controller; and
learning a level of the increase in the torque by the controller such that the change detected by the controller comes close to a target change.

16. The control method according to claim 12, further comprising the steps of:
increasing the number of cylinders in which the intake valve and the exhaust valve are operated by the variable valve train when the engine speed falls below the desired speed while the intake line pressure exceeds the predetermined pressure, while the engine is operating with a reduced number of cylinders, in which the variable valve train operates the intake valve and the exhaust valve provided in a submaximal number of the cylinders and stops the intake valve and the exhaust valve provided in the remaining at least one cylinder; and
reducing the number of cylinders in which the intake valve and the exhaust valve are operated by the variable valve train when the engine speed falls below the desired speed while the intake line pressure is equal to, or less than, the predetermined pressure.

17. The control method according to claim 12, further comprising the step of:
increasing the number of valves to be operated when the engine speed falls below the desired speed while the intake line pressure exceeds the predetermined pressure, while the engine is operating with a reduced number of the valves, in which the variable valve train operates a submaximal number of a plurality of the valves provided in each of the cylinders and stops the remaining at least one valve.

18. The control method according to claim 12, further comprising the step of:
reducing the number of valves to be operated by the variable valve train when the engine speed falls below the desired speed.

19. The control method according to claim 18, further comprising the step of:
reducing the number of the valves to be operated by the variable valve train according to a load condition on an alternator.

20. The control method according to claim 12, further comprising the step of:
stopping operation of an alternator when the engine speed falls below the desired speed.

21. The control method according to claim 12, further comprising the steps of:
calculating a target torque, when the engine speed falls below the desired speed, to eliminate a decrease in the engine speed; and
setting an ignition timing based on the target torque when the controller performs one of either controlling the variable valve train based on the target torque, and controlling the intake control mechanism based on the target torque.

* * * * *